(12) United States Patent  
Chen

(10) Patent No.: US 11,551,894 B2
(45) Date of Patent: Jan. 10, 2023

(54) INTELLIGENT FUSELESS SWITCH WITH VIBRATION DETECTION

(71) Applicant: Yen-Po Chen, Taipei (TW)

(72) Inventor: Yen-Po Chen, Taipei (TW)

(*) Notice: Subject to any disclaimer, the term of this patent is extended or adjusted under 35 U.S.C. 154(b) by 475 days.

(21) Appl. No.: 16/618,456

(22) PCT Filed: Jun. 2, 2017

(86) PCT No.: PCT/CN2017/000379
§ 371 (c)(1),
(2) Date: Dec. 2, 2019

(87) PCT Pub. No.: WO2018/218388
PCT Pub. Date: Dec. 6, 2018

(65) Prior Publication Data
US 2020/0185172 A1   Jun. 11, 2020

(51) Int. Cl.
*H02H 5/00* (2006.01)
*H01H 35/14* (2006.01)
*H01H 71/24* (2006.01)

(52) U.S. Cl.
CPC .......... *H01H 35/144* (2013.01); *H01H 71/24* (2013.01); *H02H 5/00* (2013.01)

(58) Field of Classification Search
CPC ........ H02H 5/00; H01H 34/144; H01H 71/24; H01H 35/144
See application file for complete search history.

(56) References Cited

FOREIGN PATENT DOCUMENTS

| CN | 101923993 | | 12/2010 |
|----|-----------|---|---------|
| CN | 202102997 | | 1/2012 |
| CN | 205354980 U | * | 6/2016 |
| CN | 205453297 | | 8/2016 |
| JP | H08315709 A | * | 11/1996 |
| JP | H11219653 | | 8/1999 |
| JP | 2015213420 A | * | 11/2015 |
| TW | 312001 | | 5/2007 |
| TW | 201526565 | | 7/2015 |
| WO | WO2007072593 | * | 6/2007 |

* cited by examiner

*Primary Examiner* — Harry R Behm
(74) *Attorney, Agent, or Firm* — Schmeiser, Olsen & Watts LLP

(57) ABSTRACT

An intelligent fuseless switch includes a moving contactor, a switch, a base, and a vibration detection module. When the vibration detection module detects that vibration intensity is higher than a preset value, the electromagnetic trip device is triggered by the base to push the moving contactor to open a circuit. The power cannot be introduced into the house. This automatic power-off mode has an active protection effect. After the vibration detection module is installed, if it needs to be repaired, it can be directly replaced without removing the circuit breaker, thereby reducing the difficulty of maintenance greatly.

4 Claims, 3 Drawing Sheets

INTELLIGENT FUSELESS SWITCH WITH VIBRATION DETECTION

FIELD OF THE INVENTION

The present invention relates to a circuit breaker mounted on a power circuit, and more particularly to an intelligent fuseless switch that can be automatically cut off according to environmental conditions and has a replaceable module.

BACKGROUND OF THE INVENTION

In general, power is transmitted to a relay station via a power plant (power generation equipment), and then flows to a designated house one by one according to the power distribution system. When the power flows to the house, it will pass through multiple circuit breakers (also known as the main switch). In addition to controlling whether the current is passed, the circuit breaker can automatically trip when the current is too large, so as to protect the connected electrical appliances.

However, in the event of a natural disaster such as an earthquake, some electrical appliances may cause the wires to come out during the process of falling, which may cause a fire to result in a great loss. To prevent this problem is to turn off the power before the problem occurs. In order to achieve this object, some specially designed circuit breakers have the function to push the switch on the circuit breaker to the off position in the event of an earthquake.

In this prior art, a corresponding device is provided at the front (corresponding to a switch) of the specially designed circuit breaker and is connected in series with the power source. After the device is installed, the door in front of the circuit breaker cannot be closed. In addition, when there is a surge current, the device may be directly burned out. As a result, the device loses its function.

Accordingly, the inventor of the present invention has devoted himself based on his many years of practical experiences to solve these problems.

SUMMARY OF THE INVENTION

In order to overcome the above problems, the present invention provides an intelligent fuseless switch, comprising a moving contactor, a switch, a base and a vibration detection module. The moving contactor is linearly connected between a first circuit connection end and a second circuit connection end. The switch is connected to the moving contactor via a mechanism. An electromagnetic trip device is connected to the moving contactor and configured to drive the moving contactor to move to disconnect the first circuit connection end from the second circuit connection end. The base is electrically connected to the electromagnetic trip device. The vibration detection module is insertedly connected to the base. When the vibration detection module detects that vibration intensity is higher than a preset value, the electromagnetic trip device is triggered by the base to push the moving contactor to open a circuit.

When the vibration detection module detects that the vibration reaches a preset level, it will send a signal to control the electromagnetic tripper device to be actuated via the base, so that the moving contactor is moved to form an open circuit and the power cannot be introduced to the house to achieve an automatic power off effect. Besides, the base of the invention can be disposed at any position, which overcomes the problem that the special circuit breaker cannot be installed in the existing main switch box. The vibration detection module can be directly replaced without removing the circuit breaker. Even if the vibration detection module is damaged due to other external forces, only the vibration detection module needs to be replaced.

Preferably, the intelligent fuseless switch further comprises a state detection module and a signal transmission module. The state detection module is configured to detect voltage information or current information or temperature information between the first circuit connection end and the second circuit connection end. The signal transmission module is configured to transmit the voltage information or current information or temperature information or receive an instruction for performing data collection and monitoring externally to improve security.

Preferably, the base and the vibration detection module are provided with corresponding locking mechanisms, so that the base and the vibration detection module can be connected stably.

Preferably, the base is disposed beside the intelligent fuseless switch.

The present invention further provides an intelligent fuseless switch assembly, comprising a control unit, an intelligent fuseless switch as described above, and a plurality of automatic fuseless switches.

The intelligent fuseless switch is in signal communication with the control unit via a signal transmission module. Each automatic fuseless switch includes a moving contactor and a switch. The moving contactor is linearly connected between a first circuit connection end and a second circuit connection end. The switch is connected to the moving contactor via a mechanism. An electromagnetic trip device is connected to the moving contactor and configured to drive the moving contactor to move to disconnect the first circuit connection end from the second circuit connection end. The electromagnetic trip device is electrically connected to a state detection module and the signal transmission module. The signal transmission module is in signal communication with the control unit.

The above-mentioned intelligent fuseless switch assembly can be applied to a plurality of switches in a main switch box, so that the user can remotely control a desired switch to be turned off, having an advanced control effect.

Embodiments of the present invention will now be described, by way of example only, with reference to the accompanying drawings.

DETAILED DESCRIPTION OF THE PREFERRED EMBODIMENTS

The present invention discloses an intelligent fuseless switch 1 capable of detecting vibration. When the measured data is higher than the predetermined value, the intelligent fuseless switch will cause the circuit to form an open circuit to stop the transmission of power, so as to ensure that there will be no fire caused by a short circuit indoors due to an unexpected situation. In addition, the present invention overcomes the shortcomings of the prior art. Once the intelligent fuseless switch is damaged due to a surge current, only the module is replaced, and the detection and protection can be performed continuously without replacing the entire circuit breaker.

Figure 1:
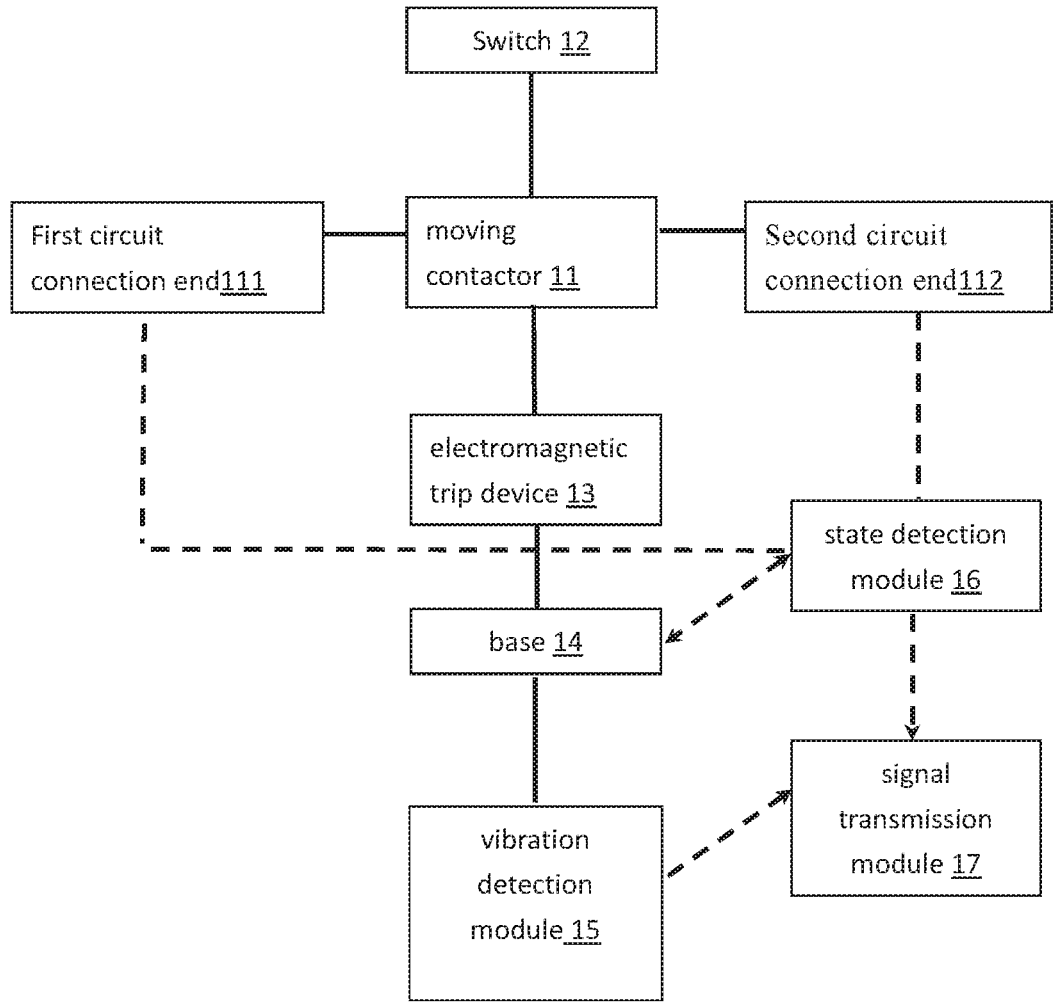
FIG. 1 is a block diagram of an embodiment of the present invention.

As shown in FIG. 1, the intelligent fuseless switch 1 according to an embodiment of the present invention comprises a moving contactor 11, a switch 12, an electromagnetic trip device 13, a base 14, and a vibration detection module 15. The electromagnetic trip device 13 described in this embodiment of the present invention is not a built-in electromagnetic trip device of the original fuseless switch 1. In addition, it is first stated that the present invention does not change the circuit structure in the original fuseless switch 1, and it is set in accordance with the needs of the mechanism.

The moving contactor 11 is linearly connected between a first circuit connection end 111 and a second circuit connection end 112. The first circuit connection end 111 and the second circuit connection end 112 are electrically connected via the moving contactor 11, so that power can be introduced into an indoor power network. When the moving contactor 11 is disconnected from the first circuit connection end 111 or the second circuit connection end 112 to form an open circuit, the power will not be introduced into the indoor power network.

The switch 12 is connected to the moving contactor 11 via a mechanism. The electromagnetic trip device 13 is connected to the moving contactor 11 and configured to drive the moving contactor 11 to move. The user can manually switch the position of the moving contactor 11 via the switch 12. When the electromagnetic trip device 13 receives an instruction, the electromagnetic trip device 13 automatically deviates from the original position because the electromagnetic force becomes larger, and disconnects the moving contactor 11 from the first circuit connection end 111 or the second circuit connection end 112, so that the first circuit connection end 111 or the second circuit connection end 112 forms an open circuit to stop the input of the power.

The base 14 is electrically connected to the electromagnetic trip device 13 for transmitting an instruction or signal output by the vibration detection module 15. The vibration detection module 15 is movably inserted on the base 14. When the vibration detection module 15 detects that the vibration intensity is higher than a preset value, the electromagnetic trip device 13 is triggered by the base 14 to push the moving contactor 11 to open the circuit.

There is no need for the base 14 to be fixed to the front of the circuit breaker 1 (for example, it can be disposed beside the intelligent fuseless switch 1), and the switch 12 is not pulled by a force from a physical mechanism, so the present invention doesn't have a complicated mechanism. The base 14 is electrically connected to the electromagnetic trip device 13. When a disaster occurs, the magnetic force of an electromagnet in the electromagnetic trip device 13 is changed to drive the switch.

The vibration detection module 15 is movably inserted on the base 14 and is in signal communication with the base 14 for transmitting the instruction from the vibration detection module 15 as the relevant medium for obtaining the current information of the vibration detection module 15. For example, a sensor that is in signal communication with the base 14 is connected to the power system for the vibration detection module 15 to read the data through the base 14. The electrical connection between the base 14 and the vibration detection module 15 is the prior art. The vibration detection module 15 and the base 14 can be connected by a wired or wireless transmission means, or by female and male signal connectors.

Through the above means, when the vibration detection module 15 is damaged due to a surge current, it can be removed and a new vibration detection module 15 can be directly replaced, thereby greatly reducing the difficulty of maintenance.

Furthermore, the present invention further comprises a state detection module 16 and a signal transmission module 17 that are in signal communication with each other. The state detection module 16 is configured to detect voltage information or current information or temperature information between the first circuit connection end 111 and the second circuit connection end 112. The signal transmission module 17 is configured to transmit voltage information or current information or temperature information or receive instructions, and can perform data transmission using PLC (Power Line Communication) technology for a more precise control. Through the collection of information, when the voltage information or current information or temperature information is abnormal, the maintenance service can be actively carried out in spite of the fact that it is not necessary to cut the power off immediately. Proactive maintenance can be performed before a disaster occurs, so as to minimize the damage.

For the base 14 and the vibration detection module 15 to be connected stably, the base 14 and the vibration detection module 15 are provided with corresponding locking mechanisms. The base 14 and the vibration detection module 15 can be fixed to each other at corresponding positions, thereby increasing the overall stability. There are various locking mechanisms on the market, which is known in the prior art. Those skilled in the art can understand and thus will not be further described herein.

Figure 2:
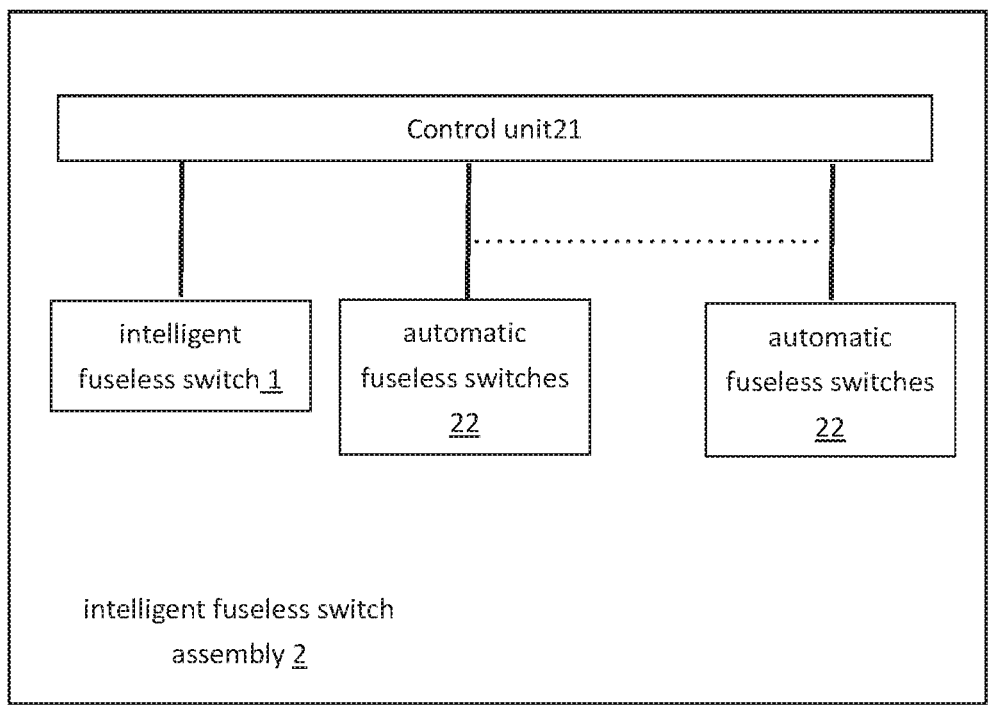
FIG. 2 is a block diagram of another embodiment of the present invention.
Figure 3:
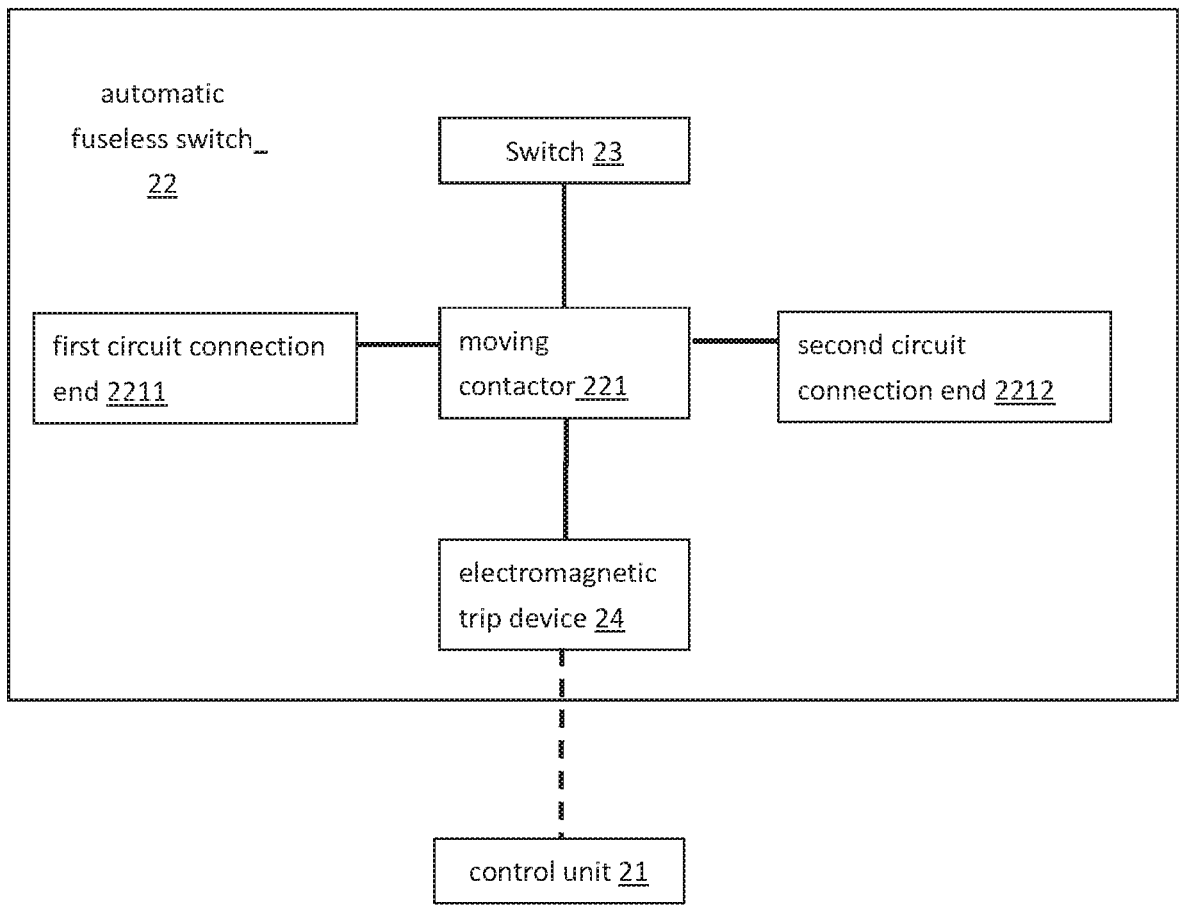
FIG. 3 is a block diagram of the automatic fuseless switch of the present invention.

In addition, as shown in FIG. 2 and FIG. 3, the present invention further provides an intelligent fuseless switch assembly 2, comprising a control unit 21, an intelligent fuseless switch 1 and a plurality of automatic fuseless switches 22.

The structure of the intelligent fuseless switch 1 has been described above and will not be described again here. The intelligent fuseless switch 1 is in signal communication with the control unit 21 via the signal transmission module.

Each of the automatic fuseless switches 22 includes a moving contactor 221, a first circuit connection end 2211, a second circuit connection end 2212, a switch 23, an electromagnetic trip device 24, a state detection module 16, and a signal transmission module 17. The moving contactor 221 is linearly connected between the first circuit connection end 2211 and the second circuit connection end 2212. The first circuit connection end 2211 and the second circuit connection end 2212 are connected via the moving contactor 221. The switch 23 is connected to the moving contactor 221 via a mechanism. The electromagnetic trip device 24 is also connected to the moving contactor 221 and can drive the moving contactor 221 to move to disconnect the first circuit connection end 2211 from the second circuit connection end 2212. The electromagnetic trip device 24 is electrically connected to the state detection module 16 and the signal transmission module 17. The signal transmission module 17 is electrically connected to the control unit 21. The control unit 21 actuates the electromagnetic trip device 24 after receiving the instruction. The state detection module 16 enables the electromagnetic trip device 24 to trip to form an open circuit when receiving a preset condition, so as to protect the subsequent circuit or appliance.

The intelligent fuseless switch assembly 2 can be used in the main switch box. When the lines are distributed, the load of each sub-switch will be evenly distributed, and some household appliances that need to use high current will be separated. Therefore, if an earthquake occurs, the sub-switch connected to the high current can be automatically turned off after a few seconds of shaking by setting the default value. This can avoid turning off the indoor lighting system to cause a person unable to escape in the dark when he/she has not left the house at the beginning of the earthquake. In addition, the control unit 21 can be controlled by a network. If the user cannot sure whether an appliance is turned off after going out, the appliance can be controlled by the corresponding sub-switch to improve the convenience of use.

In addition, the above-mentioned intelligent fuseless switch can be used as the main switch or the sub-switch in the main switch box, that is, it is determined by the installer according to the time of use.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An intelligent fuseless switch, comprising:
   a moving contactor, linearly connected between a first circuit connection end and a second circuit connection end;
   a switch, connected to the moving contactor via a mechanism, an electromagnetic trip device being connected to the moving contactor and configured to drive the moving contactor to move to disconnect the first circuit connection end from the second circuit connection end, wherein the electromagnetic trip device is electrically connected to a base;
   a vibration detection module insertedly connected to the base, wherein the vibration detection module is in signal communication with a signal transmission module capable of transmitting information or receiving an instruction;
   wherein when the vibration detection module detects that vibration intensity is higher than a preset value, the electromagnetic trip device is triggered by the base to push the moving contactor to open a circuit; and
   further comprising a state detection module configured to detect voltage information or current information or temperature information between the first circuit connection end and the second circuit connection end, the state detection module being in signal communication with the signal transmission module, wherein the electromagnetic trip device of the intelligent fuseless switch is not a built-in device of a conventional fuseless switch.

2. The intelligent fuseless switch as claimed in claim 1, wherein the base and the vibration detection module are provided with corresponding locking mechanisms.

3. The intelligent fuseless switch as claimed in claim 1, wherein the base is disposed beside the intelligent fuseless switch.

4. An intelligent fuseless switch assembly, comprising:
   a control unit;
   at least one intelligent fuseless switch as claimed in claim 1, the intelligent fuseless switch being in signal communication with the control unit via a signal transmission module, wherein the electromagnetic trip device of the intelligent fuseless switch is not a built-in device of a conventional fuseless switch; and
   a plurality of automatic fuseless switches, each including:
      a second moving contactor linearly connected between a third circuit connection end and a fourth circuit connection end;
      a second switch, connected to the second moving contactor via a second mechanism, a second electromagnetic trip device being connected to the second moving contactor and configured to drive the second moving contactor to move to disconnect the third circuit connection end from the fourth circuit connection end, the second electromagnetic trip device being electrically connected to a state detection module and the signal transmission module.

* * * * *